Sept. 16, 1941. J. YATES 2,255,957
TEA OR COFFEE BAG
Original Filed Sept. 16, 1938
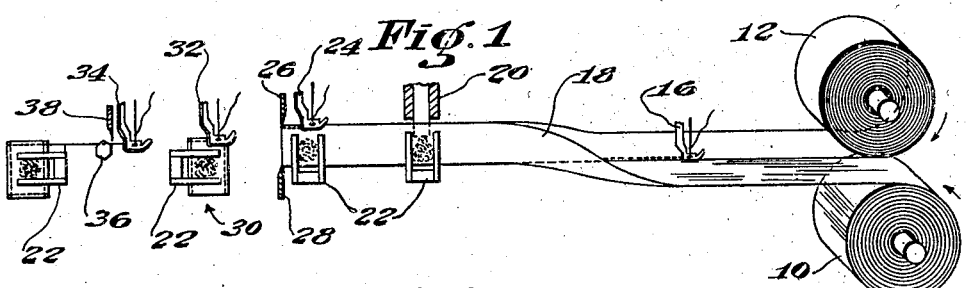
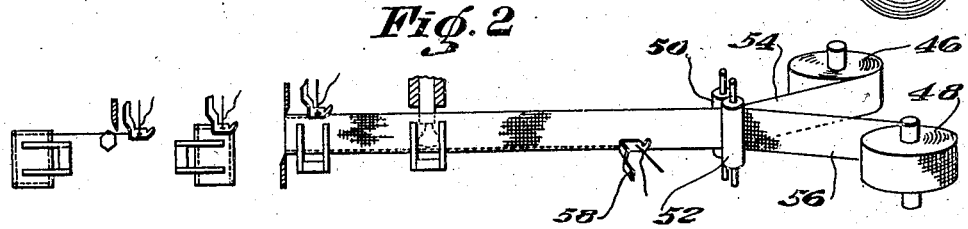
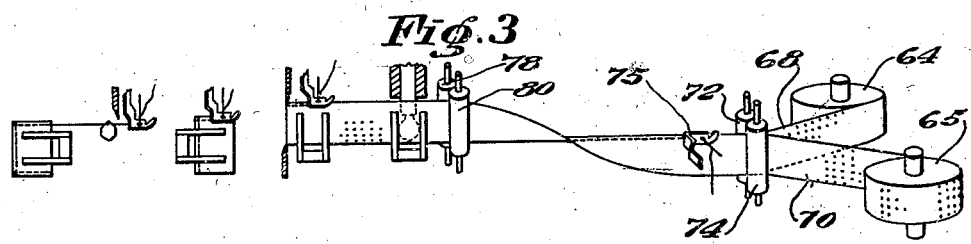
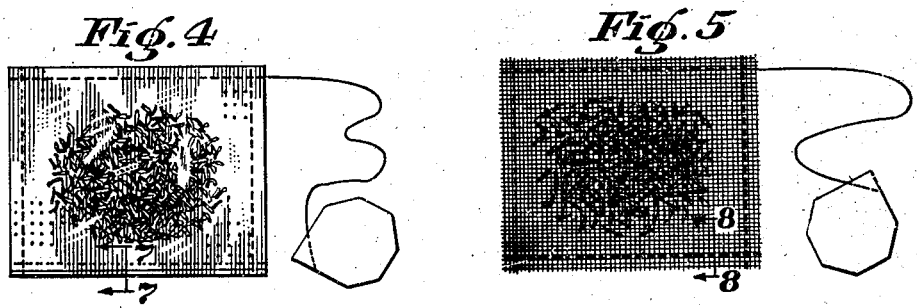
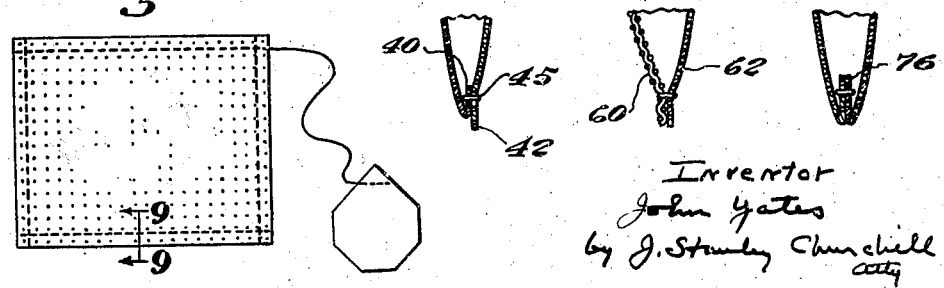
Inventor
John Yates
by J. Stanley Churchill
atty Patented Sept. 16, 1941

2,255,957

UNITED STATES PATENT OFFICE 2,255,957

TEA OR COFFEE BAG

John Yates, Quincy, Mass., assignor to Pneumatic Scale Corporation, Limited, Quincy, Mass., a corporation of Massachusetts Original application September 16, 1938, Serial No. 230,243. Divided and this application July 14, 1939, Serial No. 284,407

6 Claims. (Cl. 99—77.1)

This invention relates to a tea or coffee bag.

The object of the invention, is to provide a novel tea or coffee bag of a construction which enables the bag to be produced in an economical manner and of relatively inexpensive materials as compared with prior bags while maintaining the efficiencies of the bag for its intended purpose.

With this general object in view and such others as may hereinafter appear, the invention consists in the package and more particularly in the tea or coffee bag hereinafter described and particularly defined in the claims at the end of this specification.

In the drawing, Figs. 1, 2 and 3 are diagrammatic views partly in perspective and partly in side elevation, illustrating different methods of combining the two different materials forming the body of the bag; Figs. 4, 5 and 6 are views of the bag constructed according to the present method illustrating a few of the various combinations of materials which may be used in practicing the present invention; and Figs. 7, 8 and 9 are cross-sectional details of portions of the containers illustrated, the sections being taken on the lines 7—7; 8—8 and 9—9 of Figs. 4, 5 and 6 respectively.

In general, the present novel tea or coffee bag comprises a container having two separate half sections secured together to enclose a quantity of the tea or coffee therein. One of the half sections of the bag is composed of a material of a stiffer and more self-supporting nature than the material of which the second half section, is preferably composed and the two half sections, when secured together, form a container wherein the stiffer half section serves as a support for the less substantial material of the second half section while the latter enables economies to be secured in the ultimate cost of manufacture of the completed tea or coffee bag. Prior to the present invention, commercial tea or coffee bags have been composed of self-supporting materials such as fine gauze, better grades of parchment paper, "cellophane" and the like and the cost of such materials has contributed substantially to the ultimate cost of the completed tea or coffee bag. Attempts to produce satisfactory tea or coffee bags utilizing the more inexpensive and less substantial materials, as the cheaper grades of parchment paper, the coarser meshes of gauze and the like have been unsuccessful, principally because of the difficulty experienced in securing together the marginal portions of the bag.

In practice, in accordance with the present invention, the bag is composed of two sections secured together by stitching or otherwise and one of the sections may be composed of a relatively substantial and self-supporting material such as the better grades of parchment paper or the better grades of gauze and the second section of the bag may be formed of the more inexpensive and less substantial materials.

Referring now to the accompanying drawing, Fig. 1 represents one method of combining two different materials to form a continuous web for the production of tea bags. By way of example, the materials combined are herein illustrated as a lower roll 10 of perforated high grade "cellophane" and an upper roll 12 disposed in overlapping relation to the lower roll along one edge thereof and comprising an inexpensive and weaker "cellophane." The overlapping adjacent edges of the materials may then be stitched together by any usual or preferred form of sewing unit indicated diagrammatically at 16. The sides of the web may then be folded longitudinally as indicated generally at 18 to form the two walls of the bag. As the longitudinal strip is fed forwardly, separate charges of the commodity are deposited between the folds of the web by a suitable filling unit indicated generally at 20. The web may be gripped and advanced by the continuously travelling gripper units 22 which close upon the folded strip at points in advance of and behind the charge of tea therein. The web then may be passed by a second stitching unit 24 which closes the upper open edge of the strip by stitching together the free upper longitudinal edges thereof. While the strip in process of being sewed is advancing continuously, the knives 26, 28 operate upon the travelling strip at points midway between adjacent gripper units and sever the strip into bag sections each containing a charge of the commodity being packaged and held by a gripper unit. As the gripper units continue their advance, they are successively rotated through a quarter revolution, as illustrated diagrammatically at 30 thus bringing the bag sections into position to bring one of the severed edges uppermost where it may enter a third stitching mechanism 32.

The further advance of the gripper units 22 causes the grippers thereof to rotate successively through two quarter revolutions thus bringing the other end or severed edge of the bag section in uppermost position and in line with the stitching mechanism of the fourth sewing unit 34.

At this point in the process of producing the bag a tag 36 may be carried through the stitching mechanism of this unit so that the continuation of the stitching will cause the tag to be stitched across one edge. A suitable knife 38 may be provided to sever the thread after the tag has been attached.

Any of the usual tea bagging machines now upon the market for forming a pillow type tea container may be adapted to practice the above described method of producing a package in accordance with the present invention and except as to the manner of combining two different materials to form the container, the invention may be practiced upon a machine of the type illustrated in the United States patent to John T. Dalton, No. 1,688,268, issued October 16, 1928 to which reference may be had for more complete and further details.

The completed bag thus produced according to the above described method is illustrated in Figs. 4 and 7, the materials from which the bag is constructed being therein shown by way of example as "cellophane" on one side and perforated parchment paper or a different grade of "cellophane" on the other side. As clearly shown in Fig. 7, the overlapping lower edges 40, 42 are joined together by the stitching 45.

A modified method of joining two different materials is illustrated in Fig. 2, wherein the two rolls of different material 46, 48 are supported vertically and the strips 54, 56 are brought together between guide rollers 50, 52. The longitudinal edges of the strips 54, 56 are then stitched together by the sewing unit indicated at 58. The bag may then be completed in a manner similar to that described in connection with Fig. 1, the completed container being shown in Figs. 5 and 8. By way of example the materials used in this instance are a textile fabric 60 on one side and either "cellophane" or parchment paper 62 on the other.

Another modification of the invention is illustrated in Figs. 3, 6 and 9 showing the two different materials such as two different grades of parchment paper being fed from vertically mounted rolls 64, 65. The strips 68, 70 are guided between rollers 72, 74 and joined together at their upper longitudinal edges by the sewing unit 75. The web thus formed is turned back upon itself, being folded to confine the stiched lower edge within the bag as shown at 76 in Fig. 9. The folded web thus formed is then guided to the feeding unit and the stitching machine between rollers 78, 80 to be completed as hereinbefore described.

From the above description and by reference to the drawing, it will be observed that the present construction of the bag enables an efficient container of the envelope type to be produced with two different materials by making one side of the bag of sufficiently stable material to support the opposite side during the stitching operation thus enabling a variety of materials to be used which formerly could not be used because of their inability to withstand the stitching operation. As a result a great economy is effected in the production of the container.

While the invention has been illustrated and described as embodied in a package of the so-called "pillow" type of tea bag and of specific materials, it will be understood that other forms of containers and other materials may be used if desired.

This application is a division of my application, Serial No. 230,243, filed September 16, 1938 for Tea or coffee bag and method of making the same.

Having thus described the invention, what is claimed is:

1. An infusion bag comprising a substantially rectangular container formed of two half sections of bag-forming material secured together along the marginal edges thereof and adapted to enclose a quantity of a commodity, at least one of said half sections being formed so that water may pass therethrough, and one of said half sections being of a self-supporting nature and being substantially stronger and more stable than the other half section and adapted to support said other half section.

2. An infusion bag comprising a rectangular container formed of two half sections of bag forming material through which water may pass sewed together around the marginal portions thereof and enclosing a quantity of a commodity, one of the half sections being formed of substantially stronger and stiffer material than the other and constituting a support for the latter.

3. An infusion bag of the pillow type comprising a substantially rectangular container formed of two half sections of different bag-forming materials secured together along the marginal edges thereof and adapted to enclose a quantity of a commodity, one of said half sections being transparent so that the contents of the bag is visible from the exterior thereof, said half section being substantially stronger and stiffer than the other half section and adapted to serve as a support for said other half section.

4. An infusion bag comprising a container formed of two half sections of flexible porous bag forming material through which water may pass, said sections being sewed together around the marginal portions thereof and enclosing a quantity of a commodity, one of the half sections being formed of substantially stronger and stiffer material than the other constituting a support for the latter.

5. An infusion bag of the pillow type comprising a container formed of two sections of different kinds of bag-forming material secured together along the marginal edges thereof and adapted to enclose a quantity of a commodity, one of said sections consisting of a strip of fibrous material and the other consisting of a strip of paper, said first-mentioned section being substantially stronger and stiffer than the other half section and adapted to support said other half section.

6. An infusion bag of the pillow type comprising a container formed of two half sections of different kinds of bag-forming material secured together along the marginal edges thereof and enclosing a quantity of a commodity, one of said half sections consisting of a film of transparent material, whereby the contents of the bag are rendered visible from the exterior of said bag, and the other consisting of a strip of paper, said first-mentioned half section being substantially stronger and stiffer than the other half section and constituting a support for said other half section.

JOHN YATES.